US009352254B2

(12) United States Patent
Lee et al.

(10) Patent No.: US 9,352,254 B2
(45) Date of Patent: May 31, 2016

(54) HYBRID TYPE FIBER FILTERING APPARATUS

(71) Applicant: DOOSAN HEAVY INDUSTRIES & CONSTRUCTION CO., LTD., Gyeongsangnam-do (KR)

(72) Inventors: Woo Nyoung Lee, Seoul (KR); Sung Won Park, Gyeonggi-do (KR); Yong Hae Park, Busan (KR); Sung Woo Woo, Gyeonggi-do (KR)

(73) Assignee: DOOSAN HEAVY INDUSTRIES & CONSTRUCTION DO., LTD. (KR)

( * ) Notice: Subject to any disclaimer, the term of this patent is extended or adjusted under 35 U.S.C. 154(b) by 0 days.

(21) Appl. No.: 14/534,963

(22) Filed: Nov. 6, 2014

(65) Prior Publication Data

US 2015/0182884 A1    Jul. 2, 2015

(30) Foreign Application Priority Data

Dec. 31, 2013  (KR) ......................... 10-2013-0169254

(51) Int. Cl.
*B01D 24/12* (2006.01)
*B01D 24/10* (2006.01)
(Continued)

(52) U.S. Cl.
CPC .............. *B01D 29/56* (2013.01); *B01D 24/105* (2013.01); *B01D 24/12* (2013.01); *B01D 29/15* (2013.01); *B01D 29/58* (2013.01); *B01D 29/66* (2013.01);
(Continued)

(58) Field of Classification Search
CPC ...... C02F 3/085; C02F 3/104; C02F 2303/16; C02F 1/001; B01D 2201/186; B01D 29/114; B01D 29/66; B01D 29/56; B01D 29/68; B01D 29/96; B01D 29/15; B01D 39/04; B01D 39/1607; B01D 24/12; B01D 24/105; B01J 19/30

See application file for complete search history.

(56) References Cited

U.S. PATENT DOCUMENTS 5,587,239 A * 12/1996 Ueba et al. .................... 428/362
6,503,390 B1    1/2003 Gannon
(Continued)

FOREIGN PATENT DOCUMENTS

GB        2493052 A    1/2013
KR       100362594     11/2002
(Continued)

OTHER PUBLICATIONS

Extended European Search Report dated May 27, 2015 in corresponding European Patent Application No. 14194505.5-1351.

*Primary Examiner* — Katherine Zalasky
*Assistant Examiner* — Benjamin Lebron
(74) *Attorney, Agent, or Firm* — Baker & McKenzie LLP

(57) ABSTRACT

A hybrid type fiber filtering apparatus includes an enclosure, a strainer, a first filtering layer and a second filtering layer. The enclosure has an upper case and a lower case coupled to the upper case. The strainer is mounted inside the upper case in a longitudinal direction. The first filtering layer includes a plurality of fiber filters fixed between upper and lower fixing units and surround an outer circumferential surface of the strainer. The second filtering layer includes a plurality of fiber ball filters disposed inside the lower case. Raw water introduced into the upper case through a raw water inflow pipe passes through the first filtering layer, flows into the strainer, drops downwardly from an inside of the strainer, is introduced into the lower case, passes through the second filtering layer, and then, is discharged out through a filtered water discharge pipe.

19 Claims, 12 Drawing Sheets

(51) Int. Cl.
  *B01D 29/56* (2006.01)
  *B01D 29/58* (2006.01)
  *B01D 29/15* (2006.01)
  *B01D 29/66* (2006.01)
  *B01D 29/68* (2006.01)
  *B01D 29/96* (2006.01)
  *B01D 39/04* (2006.01)
  *B01D 39/16* (2006.01)
  *C02F 1/00* (2006.01)
  *C02F 3/08* (2006.01)
  *C02F 3/10* (2006.01)
  *B01J 19/30* (2006.01)

(52) U.S. Cl.
  CPC ............... *B01D 29/68* (2013.01); *B01D 29/96* (2013.01); *B01D 39/04* (2013.01); *B01D 39/1607* (2013.01); *C02F 3/085* (2013.01); *C02F 3/104* (2013.01); *B01D 2201/186* (2013.01); *B01J 19/30* (2013.01); *C02F 1/001* (2013.01); *C02F 2303/16* (2013.01)

(56) References Cited

U.S. PATENT DOCUMENTS

| | | |
|---|---|---|
| 2003/0164333 A1 | 9/2003 | Nohren, Jr. et al. |
| 2010/0314309 A1* | 12/2010 | Kang et al. ............ 210/385 |
| 2013/0126412 A1* | 5/2013 | Kaldate et al. ......... 210/284 |
| 2014/0014562 A1* | 1/2014 | Woo ...................... 210/137 |

FOREIGN PATENT DOCUMENTS

| | | |
|---|---|---|
| KR | 100438460 | 7/2004 |
| KR | 101088059 | 11/2011 |
| WO | 2010104104 A1 | 9/2010 |
| WO | WO 2012/133957 * | 10/2012 |

* cited by examiner

HYBRID TYPE FIBER FILTERING APPARATUS

CROSS-REFERENCE TO RELATED APPLICATIONS

This application claims priority to Korean Application No. 10-2013-0169254, filed Dec. 31, 2013, the contents of which are incorporated herein in their entirety.

BACKGROUND

The present disclosure relates to a hybrid type fiber filtering apparatus, and, more particularly, to a hybrid type fiber filtering apparatus which is formed in a duplex type in order to reduce the space it occupies. Raw water may be filtered by an upper-layer fiber filter and a lower-layer fiber ball filter so as to enhance filtering performance.

In general, filtering apparatuses supply clean, treated water by filtering polluted raw water through a filter, and have been used not only for drinking water but also for waterworks, sewage treatment, and factory water treatment. These filtering apparatuses have been used for river water treatment, factory waste water treatment, and in seawater desalination. They are a growing trend which increase the treatment quantity and improve water quality.

There are various multitype filtering apparatuses which are used for large-capacity water treatment such as a multitype pore control fiber filtering apparatus. Moreover, in order to enhance treatment speed and water quality, there are apparatuses which use a plurality of filters in which multiple filtering stages are arranged in one filter tank. For example, a pore controllable two-step net fit fiber filtering apparatus may be used. Furthermore, in some cases, a method for re-filtering water produced by filtering through an additionally-mounted cartridge filter may be used in purification plants, water treatment plants, and seawater desalination plants. However, such a method requires multiple installation sites and increased expenses. In summary, such a method has a disadvantage in that the filtering apparatus needs an installation site that is very wide and is very expensive due to the increased occupation space or installation space.

Filtering materials used in filter apparatuses are typically sand or anthracite, but such filtering materials have several issues in that floating materials in a trapped space are limited to its surface layer, and, by consequence, blockage occurs easily and is difficult to clean. Therefore, a dual media filter and a pore control fiber filter may be used in an attempt to solve the above-mentioned problems.

However, the dual media filter has a disadvantage in that it is difficult to provide filtering through multiple layers because most of the filter media agglomerates together.

In a fiber filter that is used in a pore control fiber filtering apparatus, fiber yarns having minute filaments are tied into bundles, and then the fiber yarn bundles are arranged in the water's path to serve as filtering materials. The fiber filter has advantages in that it provides excellent filtering performance because pores formed by the filaments are easily controlled by a physical control. It also has a long lifespan because it is easy to clean. Particularly, the fiber filter performs better than other filtering methods because of its removal efficiency of particles and algae existing in water as suspended solids.

However, most of the pore control fiber filters adopt a strainer method in that a strainer is arranged in the middle of an enclosure and the fiber filter is arranged outside the strainer. In the strainer raw water passes through the fiber filter. In this case, because the width of the fiber filter is thin, the subsequent filtering path is short. A method of forming the fiber filter in multi-layer may be used in an attempt to solve such a problem, but this method has problems in that efficiency is deteriorated and manufacturing costs are increased due to flocculation of the fiber filters or due to complexity in structure.

On the other hand, in order to control pores of the fiber filter, a method using hydraulic pressure of raw water has been used. Recently, a method for twisting and winding the fiber filter around a perforated pipe of the strainer or pulling the fiber filter up and down so as to compress or loosen the fiber filter has been used, for example in a pore controllable filtering apparatus.

Such fiber filtering apparatus provide a good filtering effect in an early period of use because the tensile force or a torsional tension is evenly transferred to each fiber so as to tighten upper, middle and lower portions of the subsequent filtering layer. However, when the fiber filtering apparatus is used repeatedly, the filtering layer is not formed properly and filtering performance is deteriorated because the length of the fiber is enlarged and the tensile force or the torsional tension is not evenly applied to each part of the fiber.

Additionally, in a case where raw water containing suspended solids or sludge of high concentration is treated, sediments of the raw water are concentrated or precipitated in a lower part of a filter tank, which impedes backwash to the lower portion of the fiber filter.

In addition, when the fiber filter is backwashed repeatedly, the fiber filter is stretched, and hence, the fiber filter cannot easily control pores because foreign matter stained on the fiber filter is not removed even though backwash is carried out.

Therefore, it is desirable to improve the fiber filtering apparatus to reduce the occupation space but also have a sufficiently long filtering path to control pores smoothly, to compensate a change in tensile force of the fiber filter, and to effectively clean the lower part of the fiber filter.

BRIEF SUMMARY

Accordingly, the present disclosure has been made to address the above-mentioned problems, and it is an objective of the present disclosure to provide a hybrid type fiber filtering apparatus which has an upper case duplex-type enclosure and a lower case enclosure so as to reduce occupation space. An embodiment may first filter raw water by an upper case fiber filter and second filter the raw water by a lower case fiber ball filter.

Another object of the present disclosure is to provide a hybrid type fiber filtering apparatus which can evenly distribute filtered water. The filtered water may be introduced from an upper case strainer into the lower case and then to the entire area of the fiber ball filter surface.

A further objective of the present disclosure is to provide a hybrid type fiber filtering apparatus which vertically circulates the fiber ball filter inside the lower case.

Another objective of the present disclosure is to provide a hybrid type fiber filtering apparatus which assists in the removal of contaminants from the lower part of the fiber filter and prevents or reduces flocculation of the fiber during backwash.

To accomplish the above objective(s), according to the present disclosure, provided is a hybrid type fiber filtering apparatus including: an enclosure which has an upper case and a lower case communicating with the upper case; a strainer mounted inside the upper case in a longitudinal direction; a plurality of fiber filters fixed and mounted at upper and lower fixing parts which are joined respectively to upper and lower portions of the strainer, the fiber filters forming a filtering layer while surrounding the outer circumferential surface of the strainer; and a plurality of fiber ball filters disposed inside the lower case and forming a second filtering layer, wherein raw water introduced into the upper case through a raw water inflow pipe connected to one side wall of the lower portion of the upper case passes through the first filtering layer, flows into the strainer, drops down from the inside of the strainer, is introduced into the lower case, passes through the second filtering layer, and then, is discharged out through a filtered water discharge pipe connected to the lower portion of the lower case.

The hybrid fiber filtering apparatus may include: a driving part moving the upper fixing parts up and down; and length-adjusting parts placed on a cylinder which connect the driving part with the upper fixing part in a length-adjustable manner.

Moreover, the hybrid fiber filtering apparatus may include a distribution plate formed between the upper case and the lower case, the distribution plate having a plurality of distribution holes formed uniformly.

Furthermore, the hybrid fiber filtering apparatus may include a slant board that connects the lower end portion of the strainer with an edge surface of the distribution plate so that some of the filtered water discharged from the strainer flows along the inner surface of the slant board.

Additionally, the lower face of the lower case may include a middle part formed in a flat plate and an edge part formed in an inclined surface, and a number of strainer nozzles that are joined to the middle part, such that a circulation current is supplied to the fiber ball filters so as to mix the fiber ball filters together during backwash.

In addition, a plurality of slots may be formed in the edge part of the apparatus.

Moreover, the hybrid fiber filtering apparatus may include a backwash nozzle part formed in a ring-shape along the outer circumferential surface of the lower portion of the strainer in order to spray air or water to the fiber filters during backwash.

In another aspect of the present disclosure, a hybrid type fiber filtering apparatus includes: a lower case of a cylindrical shape; an upper case connected to the lower case in a longitudinal direction in parallel with the lower case; a strainer mounted in the middle of the upper case in the longitudinal direction; fiber filters mounted on the outside of the strainer in the longitudinal direction, the fiber filters forming a first filtering layer for filtering raw water accumulated by gravity; and fiber ball filters disposed inside the lower case, the fiber ball filters forming a second filtering layer in order to filter the raw water which is introduced into the strainer does a free fall after passing through the first filtering layer.

The hybrid fiber filtering apparatus may include an upper fixing part and lower fixing part respectively fixing the fiber filters to the upper portion and the lower portion of the strainer.

Furthermore, the hybrid fiber filtering apparatus may include a driving part that adjusts pores of the fiber filters by vertically moving the upper fixing parts.

Additionally, the driving part may include: a first cylinder fixed to a support mounted on the upper portion of the upper case; a second cylinder mounted in a movable manner, the second cylinder passing the upper face of the upper case; and a connection rod that connects the first cylinder and the second cylinder with each other.

In addition, the hybrid fiber filtering apparatus may include a backwash nozzle part disposed at the lower portion of the strainer that sprays air and water upwardly so as to wash the fiber filters.

Moreover, the backwash nozzle part may include an air injection part that receives outside air.

Furthermore, the lower face of the lower case may be formed in a 'U' shape.

Additionally, the hybrid fiber filtering apparatus may include strainer nozzles disposed at the lower face of the lower case that spray air or washing water so as to circulate the fiber ball filters.

In another aspect of the present disclosure, a hybrid type fiber filtering apparatus includes: a lower case; an upper case mounted in a longitudinal direction in such a way as to communicate with the lower case; a strainer mounted inside the upper case; fiber ball filters disposed inside the lower case and forming a first filtering layer; and fiber filters surrounding the outside of the strainer and forming a second filtering layer, wherein the fiber ball filters are first washed by washing water introduced from the lower portion of the lower case, and the washing water with an elevated water level second washes the fiber filters and is discharged out through a backwash water discharge pipe of the upper portion of the upper case.

Moreover, the hybrid fiber filtering apparatus further includes strainer nozzles disposed at the lower face of the lower case that spray washing water.

Furthermore, a circulation current may be directed upward at a middle part and downward at an edge part inside the lower case by the stream of water sprayed from the strainer nozzles.

Additionally, the washing water moving to the upper case may discharge from the strainer through through holes of the strainer so as to wash the fiber filters.

In addition, the hybrid fiber filtering apparatus may include a backwash nozzle part disposed at the lower portion of the strainer that sprays water or air so as to shake the fiber filters.

The hybrid type fiber filtering apparatus according to an embodiment of the present disclosure can first filter raw water by an upper case fiber filter and second filter the raw water by a fiber ball filter of the lower case so as to expand a filtering path and enhance filtering performance because the raw water passes filtering layers of the duplex type.

Moreover, the hybrid type fiber filtering apparatus according to an embodiment of the present disclosure has the enclosure formed in the duplex type of the upper case and the lower case so as to reduce the occupation space.

Furthermore, the hybrid type fiber filtering apparatus, according to an embodiment of the present disclosure, can evenly distribute filtered water, which is introduced from a strainer of the upper case into the lower case, to the entire area of a fiber ball filter surface.

Additionally, the lower face of the lower case may be formed in the 'U'-shape, the strainer nozzles may be mounted in the middle part of the lower case, and the fiber ball filters inside the lower case may move positions while circulating up and down. Therefore, the hybrid type fiber filtering apparatus according to an embodiment of the present disclosure can more uniformly utilize the filtering performance of the fiber ball filters regardless of the surface layer and the core layer because the surface layer part of the fiber ball filters may be changed continuously.

Moreover, because the nozzles are arranged on the lower fixing part of the fiber filters in a ring shape and the lower portions of the fiber filters are moved during backwash, removal of contaminants adsorbed onto the fiber filters my be promoted and prevents flocculation of fiber yarns may be reduced or prevented.

In addition, the hybrid type fiber filtering apparatus, according to an embodiment of the present disclosure, may enhances filtering speed, may be easy to maintain, and may reduces expenses.

BRIEF DESCRIPTION OF THE DRAWINGS

The above and other objects, features and advantages of the present disclosure will be apparent from the following detailed description of embodiments of the present disclosure in conjunction with the accompanying drawings, in which.

DETAILED DESCRIPTION

Figure 1:
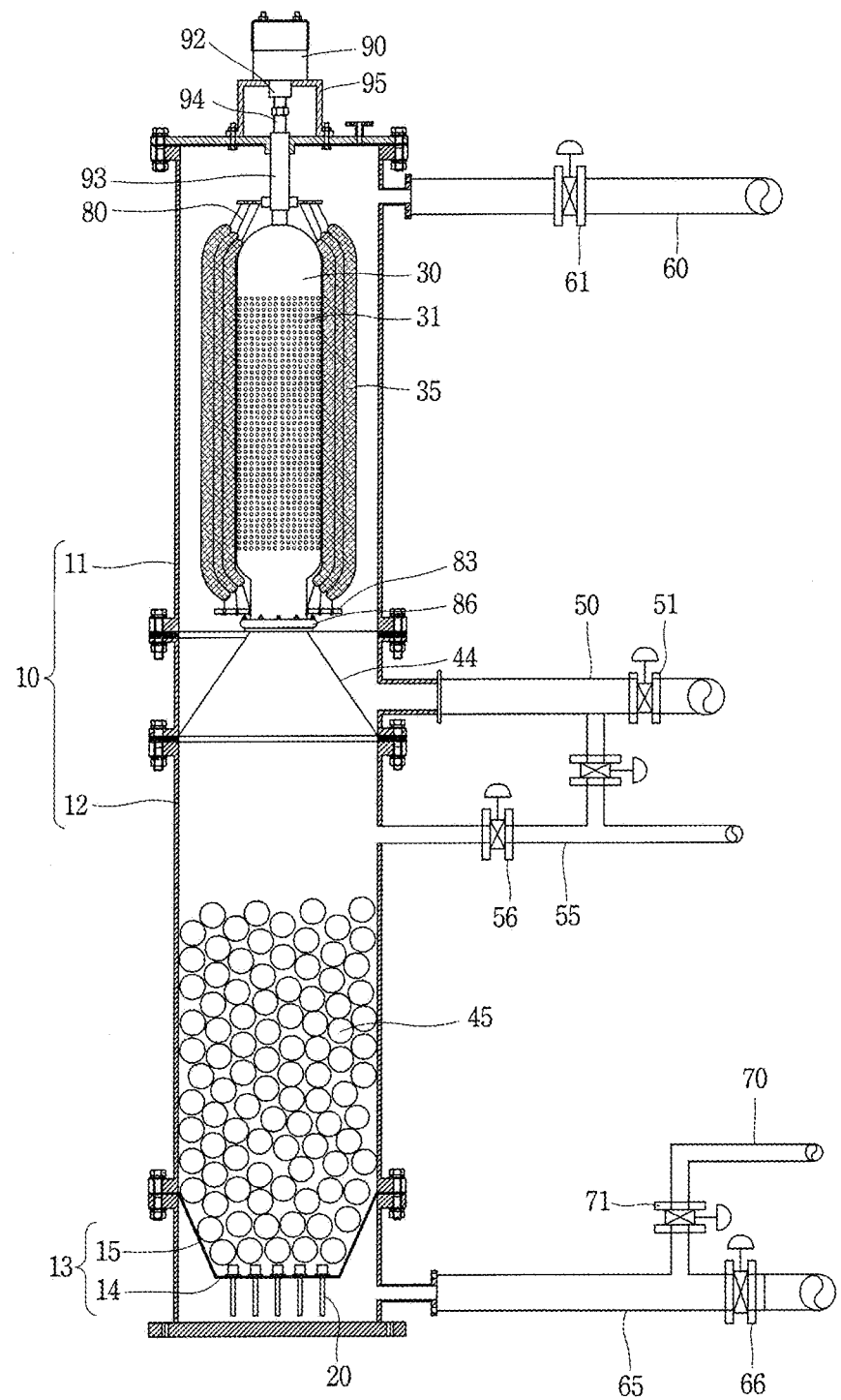
FIG. 1 is a sectional view of a hybrid type fiber filtering apparatus according to a first embodiment of the present disclosure.

Reference will be now made in detail to embodiments of the present disclosure with reference to the attached drawings. However, it will be understood that the embodiments disclosed in the present disclosure are exemplary in nature to describe the embodiments in detail in such a manner that those skilled in the art can easily execute the principles of the present disclosure but the technical idea and scope of the present disclosure are not limited by the described embodiments.

In the description of the embodiments of the present disclosure, raw water may be called filtered water, treated water or drain water according to flow paths or conditions, and backwash water may also be called washing water or drain water.

The hybrid type fiber filtering apparatus according to a first embodiment of the present disclosure includes: an enclosure 10 having an upper case 11 and a lower case 12 communicating with the upper case 11; a strainer 30 mounted inside the upper case 11 in a longitudinal direction; a plurality of fiber filters 35 fixed and mounted at upper and lower fixing parts 80 and 83 which are respectively joined to upper and lower portions of the strainer 30, the fiber filters 35 forming a first filtering layer while surrounding the outer circumferential surface of the strainer 30; and a plurality of fiber ball filters 45 disposed inside the lower case 12 forming a second filtering layer.

Figure 2:
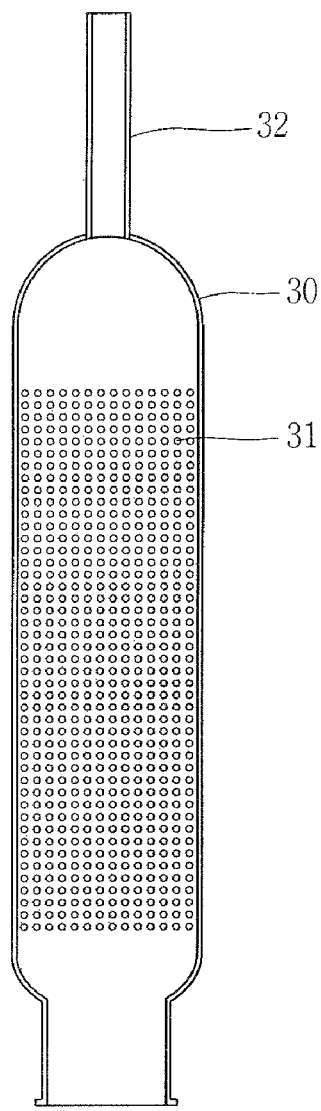
FIG. 2 is a front view of a strainer of FIG. 1.
Figure 3:
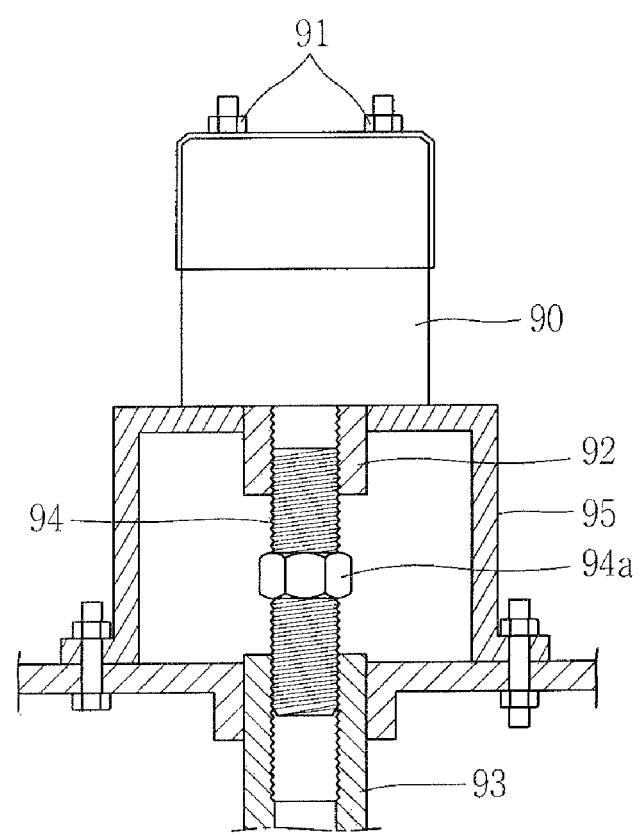
FIG. 3 is a sectional view of a driving part of FIG. 1.
Figure 4:
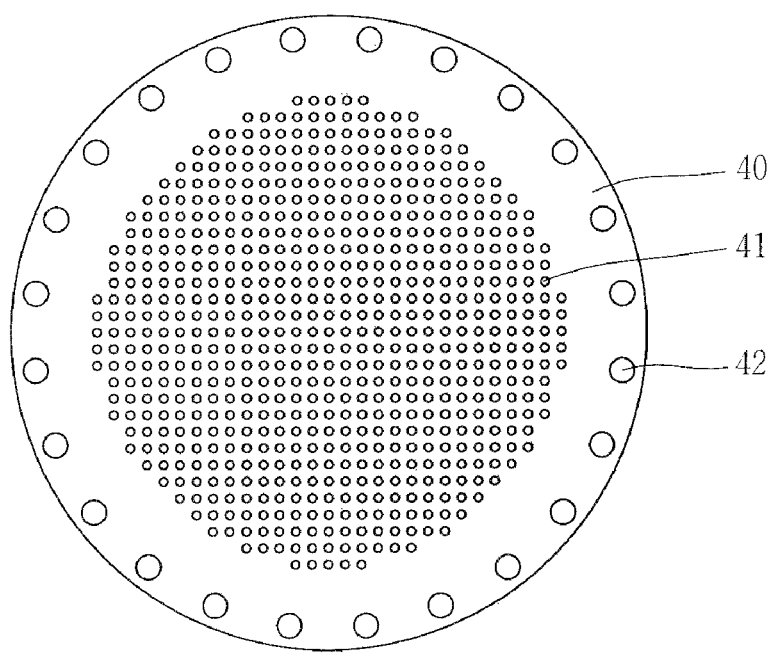
FIG. 4 is a plan view of a distribution plate of FIG. 1.
Figure 5:
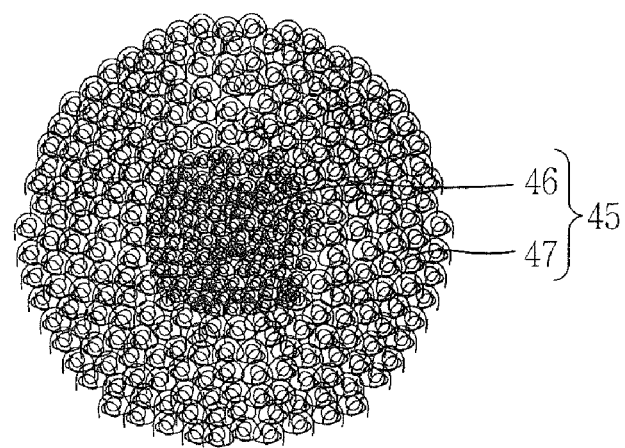
FIG. 5 is a sectional view of a fiber ball filter of FIG. 1.
Figure 6:
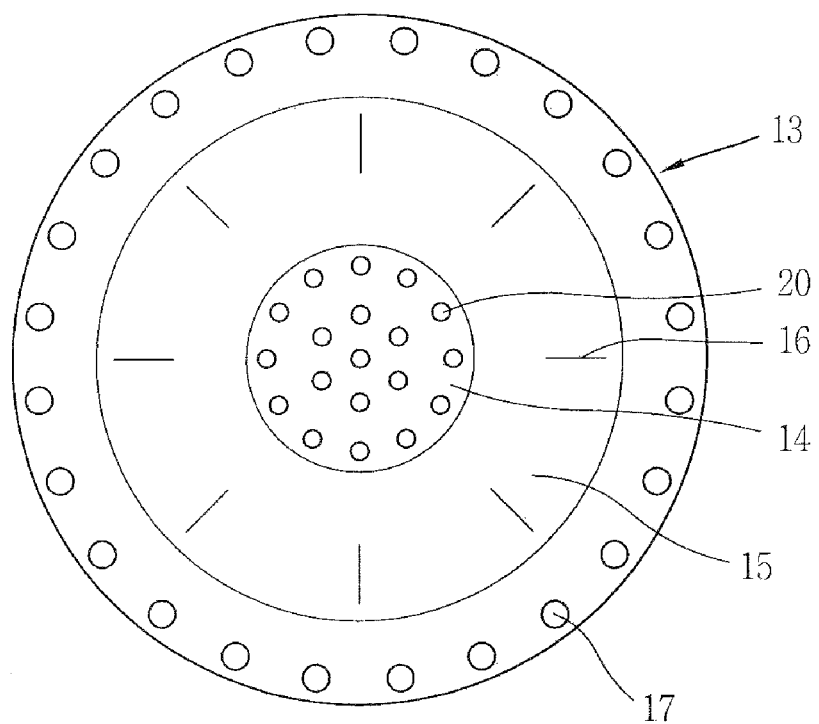
FIG. 6 is a plan view of a lower surface of a lower case of FIG. 1.
Figure 7:
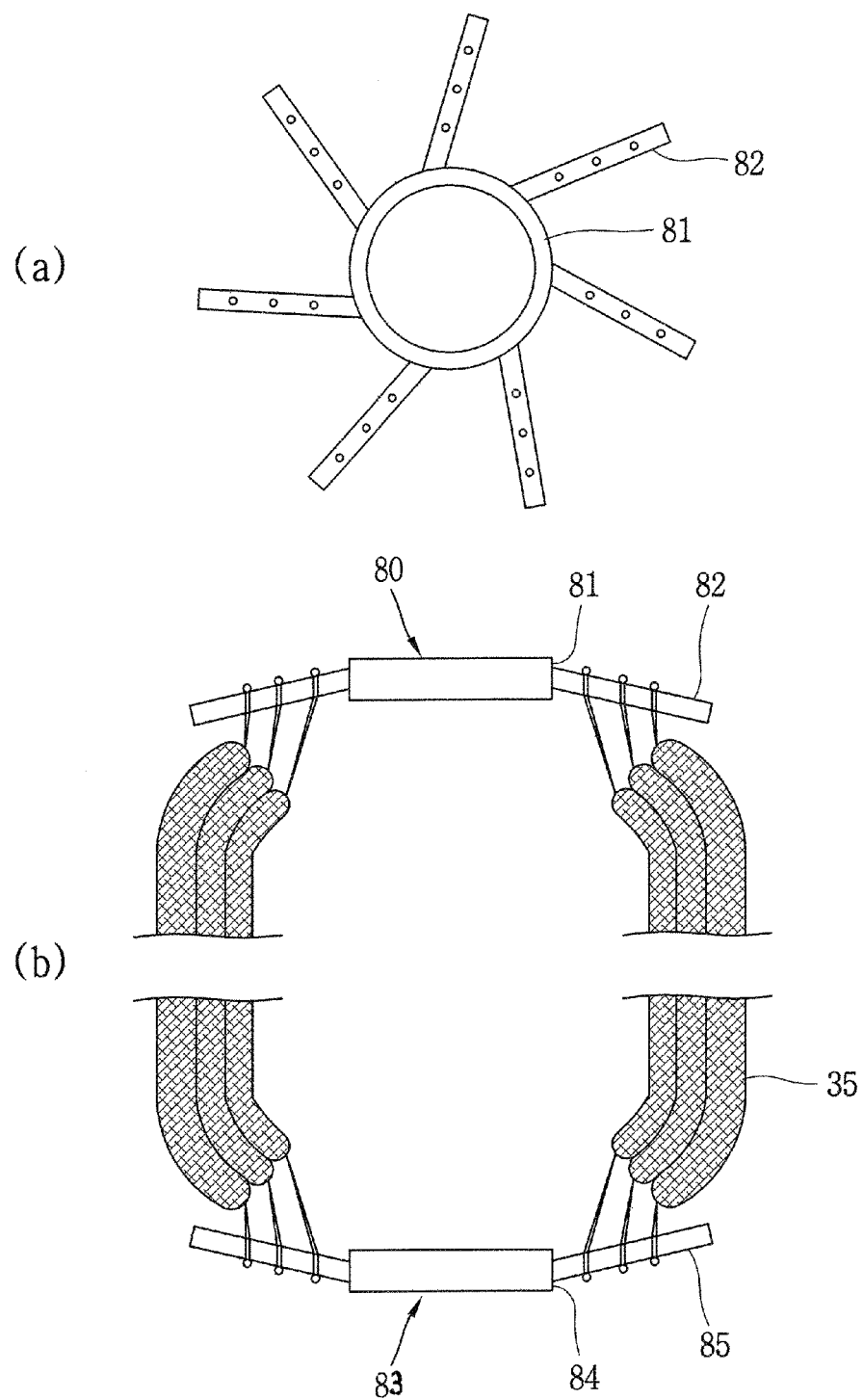
FIG. 7 is a plan view and a side view of lower fixing part and upper fixing part of a hybrid type fiber filtering apparatus according to a second embodiment of the present disclosure.

FIG. 1 is a sectional view of a hybrid type fiber filtering apparatus according to the present disclosure, FIG. 2 is a front view of a strainer of FIG. 1, FIG. 3 is a sectional view of a driving part of FIG. 1, FIG. 4 is a plan view of a distribution plate of FIG. 1, FIG. 5 is a sectional view of a fiber ball filter of FIG. 1, FIG. 6 is a plan view of a lower surface of a lower case of FIG. 1, and FIG. 7 is a plan view and a side view of lower fixing part and upper fixing part of a hybrid type fiber filtering apparatus according to a second embodiment of the present disclosure.

The enclosure 10 may be formed in a cylindrical body. The enclosure 10 has a duplex structure, and includes the lower case 12 mounted at the bottom and the upper case 11 mounted at the upper portion of the lower case 12. The lower case 12 and the upper case 11 have the same diameter and communicate with each other. In some embodiments, the lower case 12 and the upper case 11 may be formed integrally with each other.

A raw water inflow pipe 50 is connected to one side of the lower portion of the upper case 11 in order to introduce raw water to the upper case 11. The raw water inflow pipe 50 has a raw water control valve 51 disposed at a portion of the raw water inflow pipe 50 in order to control an inflow amount of raw water.

An air inflow pipe 55 is connected to one side of the lower portion of the upper case 11 or one side of the upper portion of the lower case 12 in order to introduce air for backwash. The air inflow pipe 55 has an air control valve 56 disposed at a portion of the air inflow pipe 55 in order to control an inflow amount of air.

A backwash water discharge pipe 60 is connected to one side of the upper portion of the upper case 11 in order to discharge backwash water. The backwash water discharge pipe 60 includes a backwash water control valve 61 disposed at a portion thereof in order to control a discharge amount of backwash water.

A filtered water discharge pipe 65 is connected to one side of the lower portion of the lower case 12 in order to make filtered water flow in and out. The filtered water discharge pipe 65 includes a filtered water control valve 66 disposed at a portion thereof in order to control an inflow and outflow amount of filtered water.

An air inflow pipe 70 is connected to one side of the lower portion of the lower case 12 or a portion of the filtered water discharge pipe 65. The air inflow pipe 70 includes an air control valve 71 disposed at a portion thereof in order to control an inflow amount of air.

The strainer 30 is mounted inside the upper case 11 in the longitudinal direction. The strainer 30 is formed in an elongated cylindrical pipe, and is closed at an upper side and opened at a lower side. The strainer 30 has a plurality of through holes 31 densely formed in the side wall thereof so as to allow air or water flow in and out.

The strainer 30 has a support rod 32 formed at the upper portion. The support rod 32 is inserted and joined into a second cylinder 93 which will be described later so as to be supported by the second cylinder 93.

A plurality of the fiber filters 35 are mounted on the outer surface of the strainer 30 in the longitudinal direction to form the first filtering layer. Upper ends of the fiber filters 35 are fixed and mounted at the upper fixing part 80 which is joined to the upper portion of the strainer 30, and lower ends of the fiber filters 35 are fixed and mounted at the lower fixing part 83 joined to the lower portion of the strainer 30.

The plural fiber filters 35 are uniformly arranged in a circumferential direction in such a way as to surround all sides of the strainer 30. For this, a plurality of reaching poles 82 and 85 inserted and mounted into or protrudingly formed at outer circumferential surfaces of bodies 81 and 84 of the upper and lower fixing parts 80 and 83. In this instance, the reaching poles 82 and 85 may inclinedly protrude from the outer circumferential surfaces of the bodies 81 and 84.

Moreover, the plural fiber filters 35 are mounted on the reaching poles 82 and 85 in multiple layers. That is, the fiber filters 35 are formed in many folds so as to form a thick first filtering layer. Therefore, the filtering path of raw water may be enlongatedly formed.

The fiber filters 35 are formed by fiber yarn bundles, and fiber yarns are made of soft materials, such as polyester, polypropylene, polyamide, and so on. Furthermore, depending on the application, if ion filtration is needed, the fiber yarns may be made of conductive materials, such as polyethylene or polystyrene.

The fiber filters 35 may be compressed or relaxed in the longitudinal direction, so that pores of the fiber filters 35 can be controlled. For this, the upper fixing part 80 is formed to carry out an up and down motion. For the up and down motion of the upper fixing part 80, a driving part is disposed.

The driving part includes an actuator 90, first and second cylinders 92 and 93, and a connection rod 94. Here, the first cylinder 92 is fixed and mounted on a supporter 95 mounted at the upper portion of the upper case 11, and the second cylinder 93 passes the upper surface of the upper case 11 and is movable. The connection rod 94 is disposed between the first cylinder 92 and the second cylinder 93 to connect the first cylinder 92 and the second cylinder 93 with each other. The actuator 90 may be an actuator having a solenoid or an electronic device. The actuator 90 includes a terminal part 91 so as to be easily connected to an external power source or a controller. The actuator 90 is fixed and joined to the supporter 95 mounted on the upper portion of the upper case 11. At least one side of the supporter 95 is opened so as to allow an easy access from the outside. The first cylinder 92 and the second cylinder 93 carries out an up and down motion by a driving force of the actuator 90. The connection rod 94 is joined between the first cylinder 92 and the second cylinder 93 so as to connect the first cylinder 92 and the second cylinder 93 with each other and to control a distance between the first cylinder 92 and the second cylinder 93. The connection rod 94 has screw threads formed at both end portions thereof in opposite directions to each other, and the first cylinder 92 and the second cylinder 93 respectively have screw threads opposed to the screw threads of the connection rod 94, so that the distance between the first cylinder 92 and the second cylinder 93 can be controlled when a body part 94a of the connection rod 94 is rotated in one direction.

The support rod 32 is inserted and joined into the second cylinder 93 so as to support the strainer 30. In the meantime, the upper fixing part 80 is joined to the lower end of the second cylinder 93. The upper fixing part 80 is vertically moved according to movements of the second cylinder 93, and hence, the fiber filters 35 are pulled or relaxed in the longitudinal direction. Because the lower ends of the fiber filters 35 are joined and fixed to the lower fixing part 83 and the upper ends of the fiber filters 35 are joined to the upper fixing part 80, the size of the pores is controlled while the fiber filters are compressed by the tensile force or relaxed according to the up and down motions of the upper fixing part 80. That is, when the upper fixing part 80 is moved upwardly, the fiber filters 35 are pulled and compressed to the strainer 30 such that the size of the pores is reduced, but when the upper fixing part 80 is moved downwardly, the fiber filters 35 are relaxed due to a reduction of the tensile force such that the size of the pores is increased.

As described above, in order to adjust the length of the cylinder, the driving part has a length-adjusting unit. The reason is to compensate the length of the cylinder when the pores are not formed in a desired size due to the reduction of the tensile force by the upper fixing part 80 in case that filaments of the fiber filters 35 are lengthened due to a long-term use. As an example, the length-adjusting unit may include a first cylinder 92, a second cylinder 93 and a connection rod 94, and as described above, can adjust the length between the actuator 90 and the upper fixing part 80.

Meanwhile, because the length-adjusting unit is exposed to the outside of the upper case 11, a user can easily control a tensile force of the upper fixing part 80. When a length-direction tensile force of the fiber filters 35 is reduced due to a long-term use, the user adjusts the length-adjusting unit in such a way as to upwardly move the second cylinder 93 so as to increase the tensile force.

The fiber filters 35 may be mounted in such a manner that the fiber filters 35 formed on the inner layer receive more tensile force than the fiber filters 35 formed on the outer layer. For this, the reaching pole 82 of the upper fixing part 80 is inclined downwardly, and the reaching pole 85 of the lower fixing part 83 is inclined upwardly (See FIG. 7). The pores of the inner layer of the fiber filters 35 are smaller than those of the outer layer of the fiber filters 35 because they receive more tensile force than those of the outer layer. Therefore, the raw water moves along the filtering path from the larger pores to the smaller pores.

Figure 8:
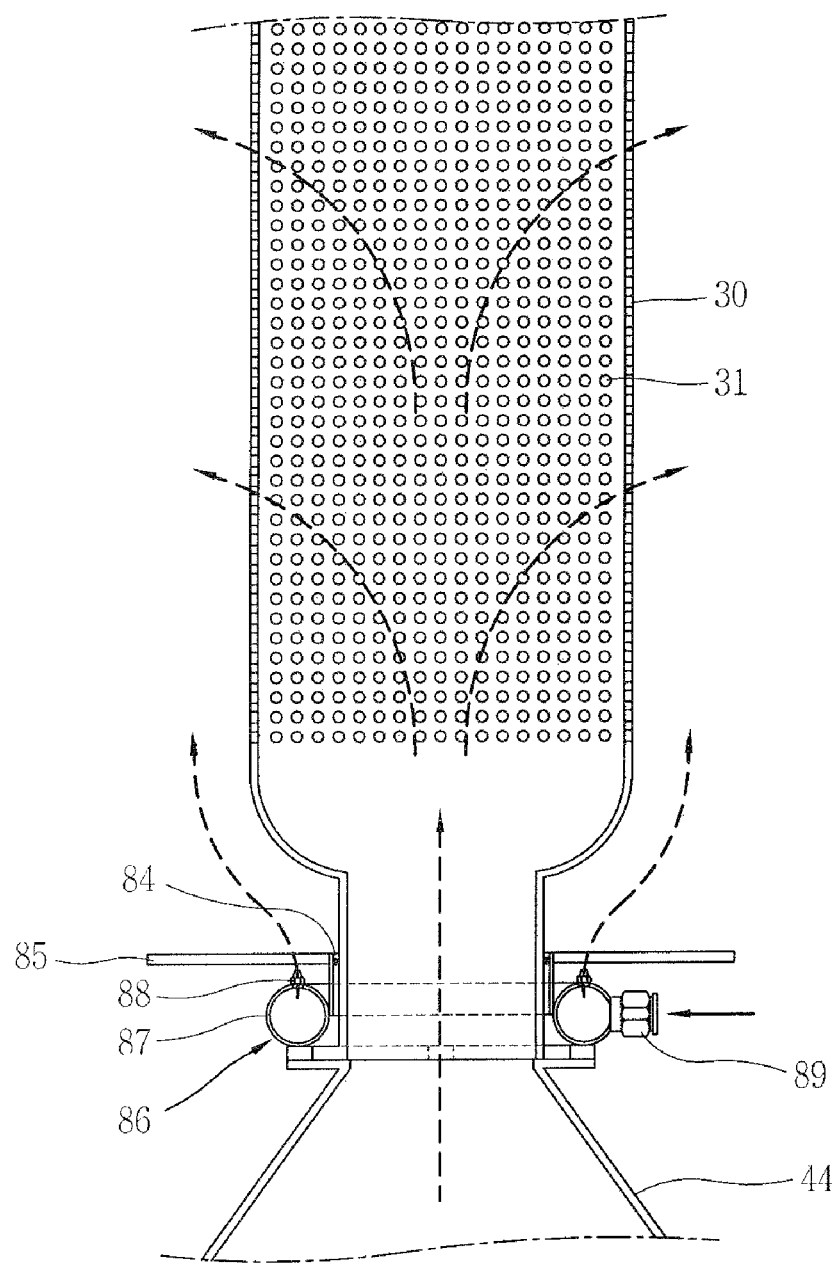
FIG. 8 is a partially sectional view of a hybrid type fiber filtering apparatus according to the second embodiment of the present disclosure.
Figure 9:
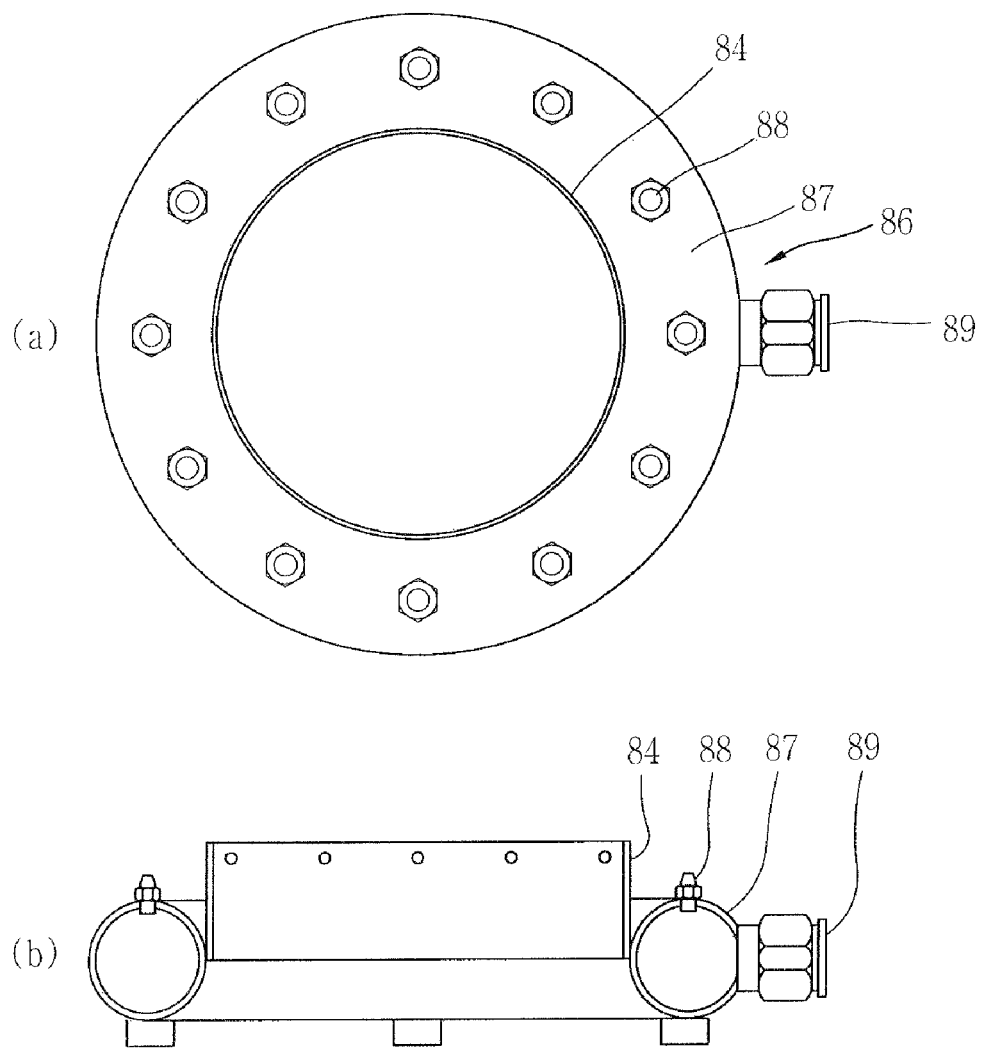
FIG. 9 is a plan view and a sectional view of a backwash nozzle part of FIG. 8.

A backwash nozzle part 86 may be disposed on the lower portion of the strainer 30. Referring to FIGS. 8 and 9, the backwash nozzle part 86 includes a ring-shaped body 87 and a plurality of nozzles 88 formed at the upper portion of the ring-shaped body 87. The air introduced from the air inflow pipe 55 is sprayed upwardly through the nozzles 88 of the nozzle part 86 so as to upwardly move air and water and to shake the relaxed lower portion of the fiber filters 35. Therefore, the fiber filters 35 are washed while receiving friction force by backwash water and air. In the meantime, the backwash nozzle part 86 includes an air injection part 89 that injects air through another path besides the air inflow pipe 55.

According to embodiments, the backwash nozzle part 86 may be formed integrally with the lower fixing part 83.

A distribution plate 40 is mounted between the upper case 11 and the lower case 12. The distribution plate 40 has a disc-shaped body and a plurality of distribution holes 41 of uniform size in order to evenly disperse and introduce the filtered water passing the fiber filters 35 and the strainer 30 into the lower case 12. The filtered water may be evenly distributed to the entire area of the distribution plate 40 except a joining portion of the edge of the distribution plate 40. For screw coupling, a thread groove 42 may be formed along the circumference of the joining portion of the edge of the distribution plate 40.

Meanwhile, a slant board 44 ranging from the lower end portion of the strainer 30 to the edge of the distribution plate 40 may be formed in the circumferential direction so as to widely disperse the first filtered water discharged from the strainer 30 to the edge of the lower case 12. That is, in the sectional view of the drawings, the slant board 44 is formed in a conical shape. Some of the filtered water flows along the inner surface of the slant board 44, and then, is introduced into the lower case 12 through the distribution holes 41 while flowing inwardly from the edge of the distribution plate 40.

A plurality of the fiber ball filters 45 are disposed in the lower case 12 so as to form the second filtering layer. The fiber ball filters 45 may be spherical porous filters made from cotton and serve to second filter the first filtered water which passed the fiber filters 35 and the strainer 30 of the upper case 11. Each of the fiber ball filters 45 includes a solid core portion 46 and a surface portion 47 connected to the core portion 46 and providing a thick fiber layer. The fiber ball filter 45 may have a diameter of about 10 mm to 50 mm.

Figure 10:
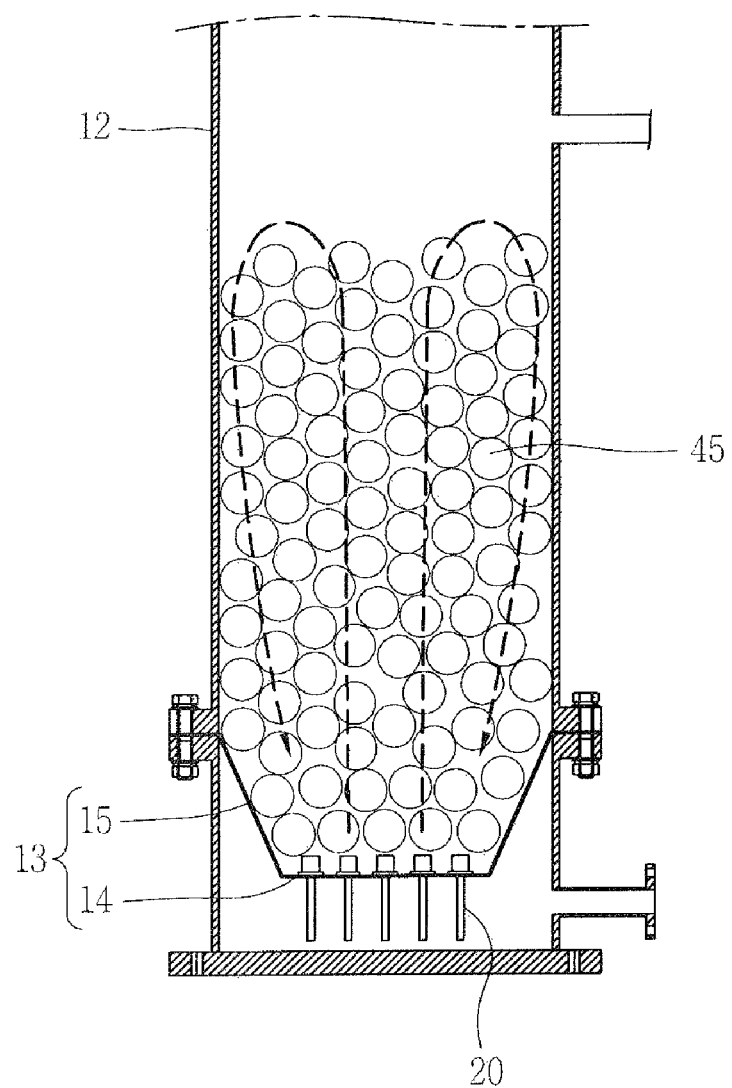
FIG. 10 is a partial view showing a backwash operation of the hybrid type fiber filter apparatus according to the first embodiment of the present disclosure.

A lower face 13 of the lower case 12 is generally formed in a 'U' shape and a plurality of strainer nozzles 20 are mounted thereon. The strainer nozzles 20 upwardly spray air or water such that the fiber ball filters 45 are mixed. The lower face 13 of the lower case 12 may be divided into a middle part 14 and an edge part 15. The middle part 14 is formed in a flat plate and the strainer nozzles 20 are mounted thereon, and the edge part 15 is inclined upwardly in the form of a 'V' shape. Therefore, when air or water is sprayed from the strainer nozzles 20, a circulation current facing upward at the middle part 14 and facing downward at the edge part 15 is formed, such that the fiber ball filters 45 are mixed together smoothly and washed evenly, and then the positions of the fiber ball filters 45 are changed randomly (See FIG. 10). That is, because a plurality of the fiber ball filters 45 are mixed and placed randomly on the surface layer of the second filtering layer, the fiber ball filters do not need to be frequently replaced with new ones and can maintain filtering performance for a long time, differently from other cartridge filters.

Moreover, a plurality of slots 16 are formed in the edge part 15 in order to promote circulation of the circulation current, and some of the washing water flows to the lower portion through the slots 16 during filtration. A thread groove 17 may be formed in the outermost edge portion of the lower face 13 for screw coupling.

Now, the operation of the hybrid type fiber filtering apparatus according to embodiments of the present disclosure will be described. The operation of the hybrid type fiber filtering apparatus according to an embodiment of the present disclosure is largely divided into three parts: one being an action to filter the raw water to make treated water; another being an action to backwash the fiber filters; and another being an action to backwash the fiber ball filters and the fiber filters.

Figure 11:
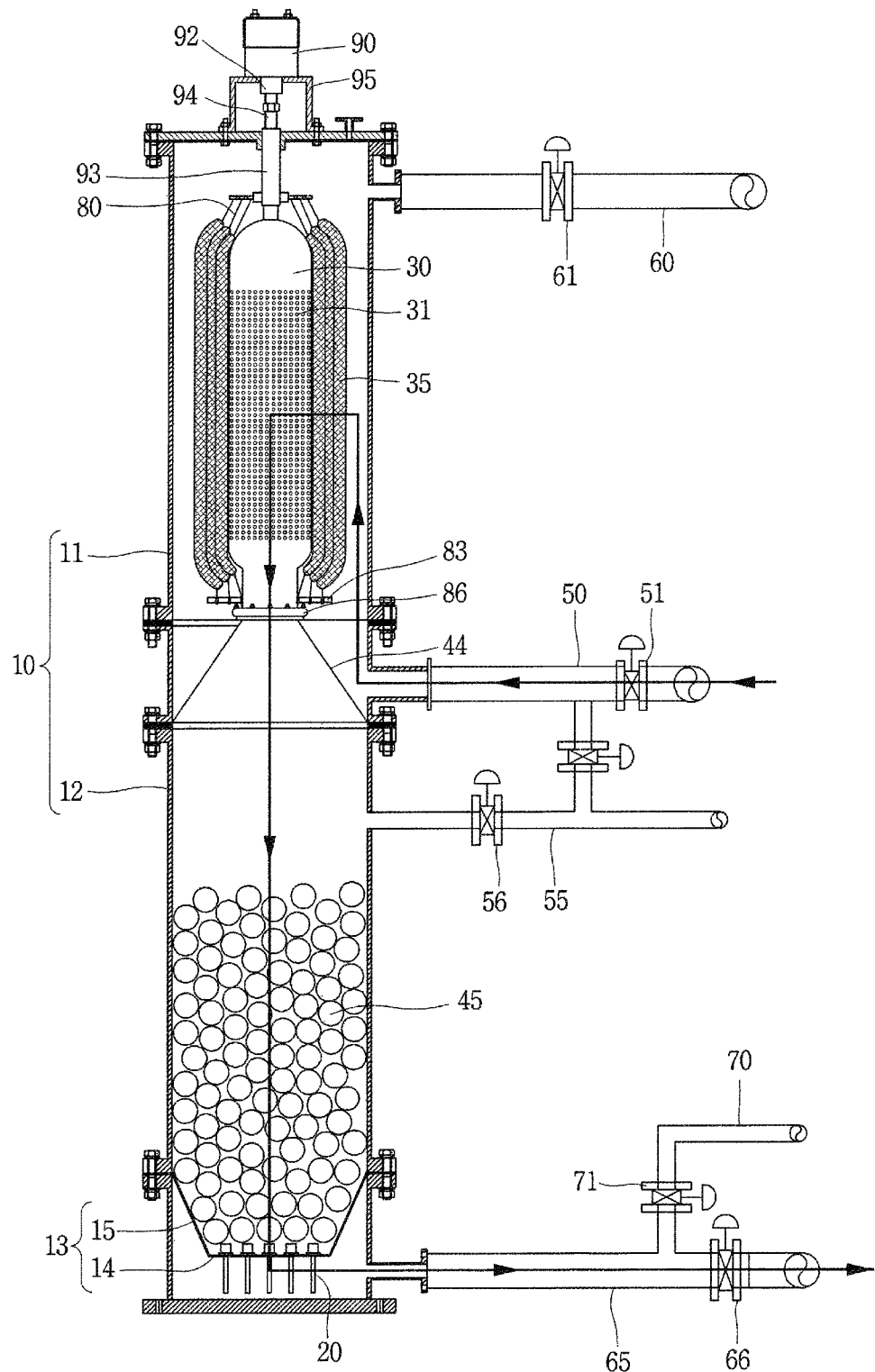
FIG. 11 is a view showing a filtering operation of the hybrid type fiber filter apparatus according to the first embodiment of the present disclosure.

First, referring to FIG. 11, the process of filtering the raw water to make treated water will be described.

When the raw water control valve 51 is opened, raw water is introduced into the upper case 11 through the raw water inflow pipe 50. The raw water is introduced into the upper case along the outer face of the slant board 44 by receiving pressure through a pump (not shown) formed on the outer face of the raw water inflow pipe 50, and then, is temporarily stored in a space formed between the upper case 11 and the strainer 30. Therefore, height of the raw water treated by hydraulic pressure is increased. The raw water is first filtered through the first filtering layer formed with the fiber filters 35, and then, is introduced into the strainer 30 through the through holes 31 of the strainer 30. The first filtered treated water flows or drops downwardly along the inner wall of the strainer 30 and the inner face of the slant board 44, and then, reaches the distribution plate 40. The first treated water is introduced into the lower case 12 through the distribution holes 41, and then may be evenly distributed to the surface layer of the second filtering layer made with the fiber ball filters 45. The first treated water is second filtered while passing the second filtering layer. The second filtered water is discharged out through the filtered water discharge pipe 65.

The filtering performance of the first filtering layer through which the raw water is first filtered may be varied according to sizes of the pores of the fiber filters 35. That is, when the supporter 95 of the driving part moves upward so as to upwardly move the upper fixing part 80, the fiber filters 35 are pulled and the fiber filters 35 are compressed to the strainer 30, such that the size of the pores is decreased.

Meanwhile, if there is a limitation only by the movement of the supporter 95, the user may adjust the length-adjusting nut 97 so as to reduce a distance between a connection piston 96 and the supporter 95, and then, the upper fixing part 80 is moved upwardly so as to increase the tensile force acting to the fiber filters 35.

Figure 12:
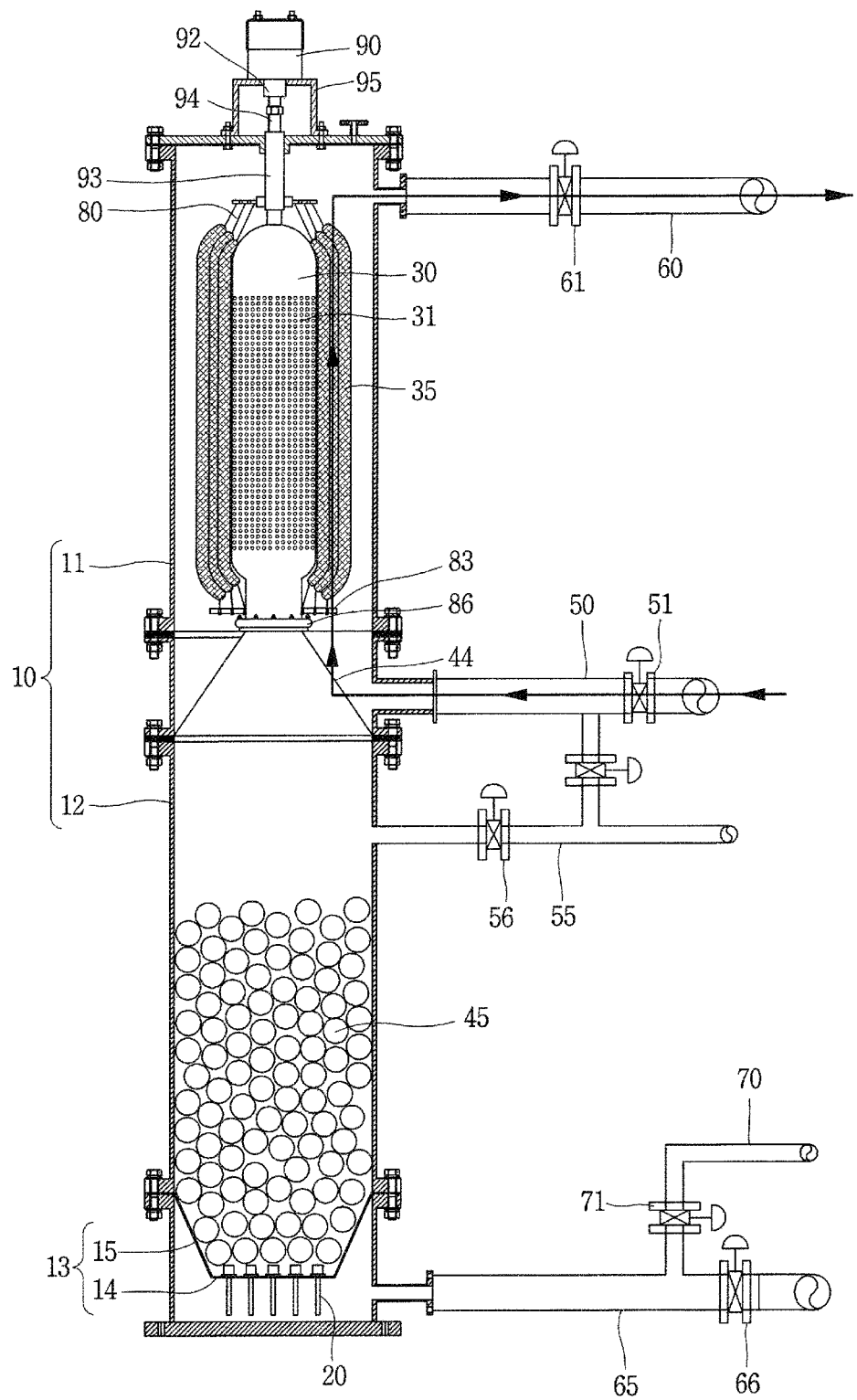
FIG. 12 is a view showing a backwash process of a fiber filter of the hybrid type fiber filter apparatus according to the first embodiment of the present disclosure.

Next, referring to FIG. 12, a backwash operation of the fiber filters 35 will be described.

When the filtered water control valve 66 is closed, the backwash control valve 61 is opened. Backwash water introduced through the raw water inflow pipe 50 washes the fiber filters 35 while flowing upwardly, and then, is discharged out through the backwash discharge pipe 60. In this instance, the supporter 95 of the driving part is moved downward, such that the fiber filters 35 are in a relaxed state.

Furthermore, pressurized air is introduced into the upper face 11 through the air inflow pipe 55, and then, is sprayed upward through the backwash nozzle part 86. The air sprayed upward shakes the lower portions of the fiber filters 35 so as to effectively promote washing. Therefore, the filtering performance is improved and the service life and lifespan of the filtering apparatus are increased through the effective washing of the fiber filters 35.

Figure 13:
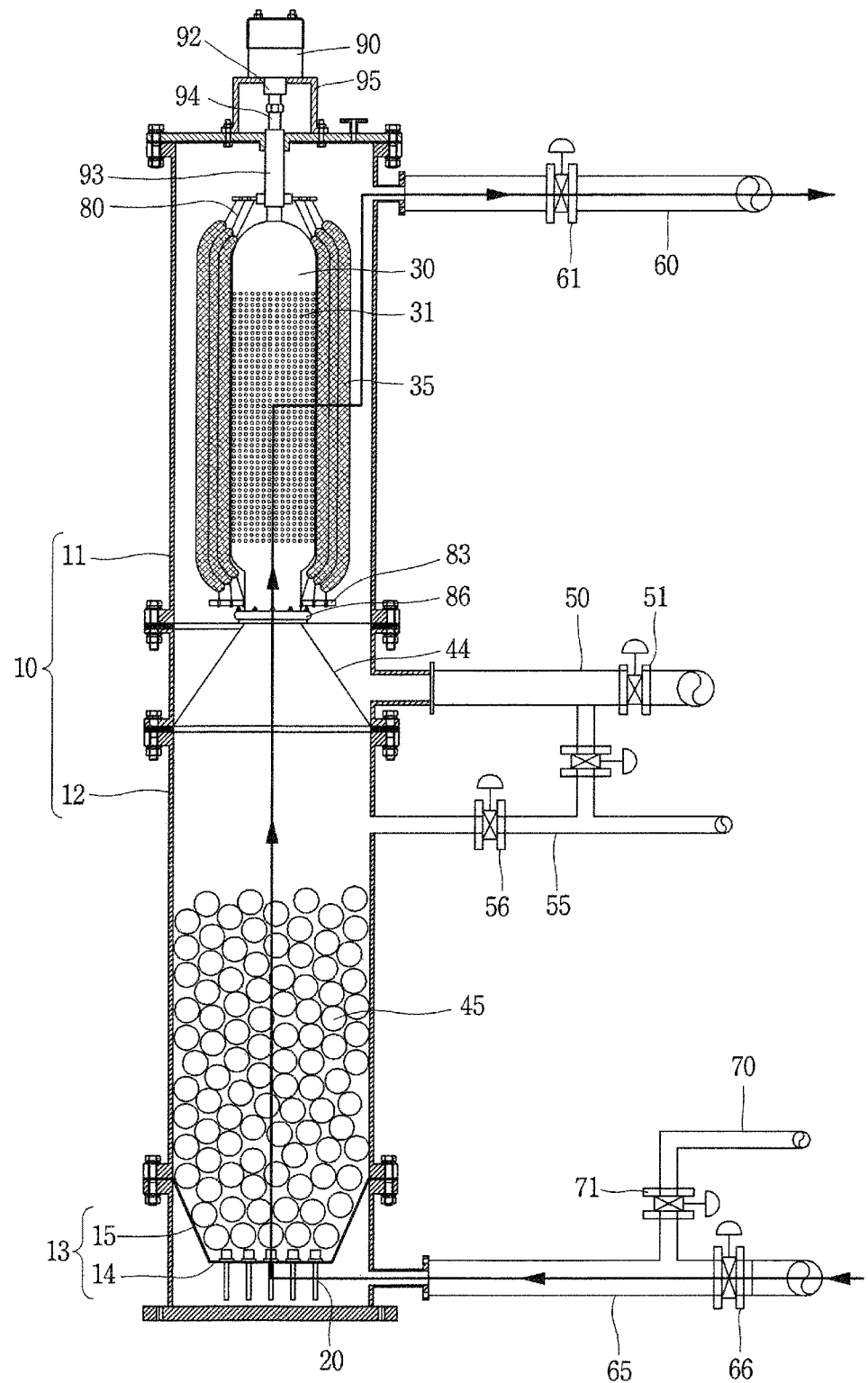
FIG. 13 is a view showing a backwash process of the fiber filter and a fiber ball filter of the hybrid type fiber filter apparatus according to the first embodiment of the present disclosure.

Next, referring to FIG. 13, a backwash operation of the fiber ball filters 45 and the fiber filters 35 will be described.

When the raw water control valve 51 is closed, the filtered water control valve 66 is opened. The washing water introduced through the filtered water discharge pipe 65 is sprayed from the strainer nozzles 20 so as to wash the fiber ball filters 45. In this instance, a circulation current which faces upward at the middle part 14 but faces downward at the edge part 15 is formed in the lower case 12 by the stream of water sprayed from the middle part 14 of the lower face of the lower case 12. The fiber ball filters 45 are mixed together and may be evenly washed by the circulation current. The washing water flowing to the upper case 11 because of the lower case 12 which is filled with water is introduced into the strainer 30 and washes the fiber filters 35 while getting out of the strainer 30 through the through holes 31. The washing water which washed the fiber filters 35 is discharged out through the backwash water discharge pipe 60.

Also in this case, in the state where the supporter 95 of the driving part lowers to relax the fiber filters 35, the washing work is carried out, and in this instance, when the washing work is carried out while spraying compressed air through the backwash nozzle part 86, the washing work is carried out more effectively as described above.

In case that the filaments of the fiber filters 35 are enlarged due to a long-term use, the user may adjust the length-adjusting nut 97 in order to shorten the distance between the supporter 95 and the connection piston 96, so that the tensile force acting to the fiber filters 35 by the upper fixing part 80 can be compensated.

When the tensile force acting to the fiber filters 35 is adjusted by the length-adjusting unit, the service life of the fiber filters 35 can be increased. Therefore, the expenses of the filtering apparatus can be reduced and the life span may be increased.

Of course, in all of the embodiments of the present disclosure, the controls of the valves and the operations of the driving part and the length-adjusting unit can be provided by a separate controller which controls the operations electronically.

While the present disclosure has been particularly shown and described with reference to exemplary embodiments thereof, it will be understood by those of ordinary skill in the art that various changes and modifications may be made therein without departing from the technical idea and scope of the present disclosure and such changes and modifications belong to the claims of the present disclosure. Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A hybrid type fiber filtering apparatus, comprising:
    an enclosure having an upper case and a lower case coupled to the upper case, a distal end of the upper case defining an upper end and a distal end of the lower case defining a lower end;
    a strainer mounted inside the upper case in a longitudinal direction;
    an upper fixing unit coupled to an upper portion of the strainer;
    a lower fixing unit coupled to a lower portion of the strainer;
    a first filtering layer including a plurality of fiber filters fixed between the upper and lower fixing units and surrounding an outer circumferential surface of the strainer;
    a second filtering layer including a plurality of fiber ball filters disposed inside the lower case;
    a raw water inflow pipe coupled to one side wall of a lower portion of the upper case;
    a filtered water discharge pipe coupled to a lower portion of the lower case;
    a distribution plate disposed between the upper case and the lower case; and
    a slant board disposed inside the enclosure that couples a lower end portion of the strainer with an edge surface of the distribution plate, wherein
    a first surface of the slant board is disposed at an angle with respect to the raw water inflow pipe such that raw water introduced into the upper case through the raw water inflow pipe is directed towards the upper end,
    a second surface of the slant board is operable to direct some of water discharged from the strainer along the slant board towards the second filtering layer,
    a passage operable to pass water is defined from an interior of the first filtering layer in the upper case through into the lower case to the second filtering layer, the passage being oriented in a vertical direction, the vertical direction being defined from the upper end to the lower end, and
    the filtered water discharge pipe is disposed at a side of the second filtering layer toward the lower end.

2. The hybrid fiber filtering apparatus according to claim 1, further comprising:
    a driving part that moves the upper fixing unit upwardly and downwardly; and
    a length-adjusting unit disposed on a cylinder which connects the driving part with the upper fixing unit.

3. The hybrid fiber filtering apparatus according to claim 1, wherein the distribution plate includes a plurality of distribution holes formed uniformly.

4. The hybrid fiber filtering apparatus according to claim 1, wherein a lower face of the lower case includes:
    a middle part formed in a flat plate,
    an edge part formed in an inclined surface, and
    a plurality of strainer nozzles coupled to the middle part, such that a circulation current supplied to the fiber ball filters through the strainer nozzles mixes the fiber ball filters together.

5. The hybrid fiber filtering apparatus according to claim 4, wherein a plurality of slots are formed in the edge part.

6. The hybrid fiber filtering apparatus according to claim 1, further comprising:
    a backwash nozzle formed in a ring-shape along an outer circumferential surface of the lower portion of the strainer that sprays air or water to the fiber filters.

7. A hybrid type fiber filtering apparatus, comprising:
    a lower case having a cylindrical shape;
    an upper case coupled to the lower case in a longitudinal direction;
    a strainer mounted in the middle of the upper case in the longitudinal direction;
    a raw water inflow pipe coupled to one side wall of a lower portion of the upper case;
    a distribution plate disposed between the upper case and the lower case; and
    a slant board disposed inside the enclosure that couples a lower end portion of the strainer with an edge surface of the distribution plate, a first surface of the slant board being disposed at an angle with respect to the raw water inflow pipe such that raw water introduced into the upper case through the raw water inflow pipe is directed towards an upper end of the upper case;
    fiber filters mounted on the outside of the strainer in the longitudinal direction, the fiber filters providing a first filtering layer that filters accumulated raw water by gravity; and
    fiber ball filters disposed inside the lower case, the fiber ball filters providing a second filtering layer that filters water that is supplied to the strainer and falls by gravity to the second filtering layer after passing through the first filtering layer, at least some of the water supplied by the strainer and falling by gravity being directed by a second surface of the slant board.

8. The hybrid type fiber filtering apparatus according to claim 7, further comprising:

an upper fixing part and a lower fixing part that respectively couple the fiber filters to an upper portion and a lower portion of the strainer.

9. The hybrid type fiber filtering apparatus according to claim 7, further comprising:
   a driving part that adjusts pores of the fiber filters by vertically moving the upper fixing part.

10. The hybrid type fiber filtering apparatus according to claim 9, wherein the driving part comprises:
   a first cylinder coupled to a support mounted on an upper portion of the upper case;
   a second cylinder mounted in a movable manner; and
   a connection rod that connects the first cylinder and the second cylinder with each other.

11. The hybrid type fiber filtering apparatus according to claim 7, further comprising:
   a backwash nozzle disposed at a lower portion of the strainer that sprays air and water upwardly to wash the fiber filters.

12. The hybrid type fiber filtering apparatus according to claim 11, wherein the backwash nozzle includes an air injector that receives outside air.

13. The hybrid type fiber filtering apparatus according to claim 7, wherein a lower face of the lower case is formed in a 'U' shape.

14. The hybrid type fiber filtering apparatus according to claim 13, further comprising:
   strainer nozzles disposed at a lower face of the lower case that spray air or washing water to circulate the fiber ball filters.

15. A hybrid type fiber filtering apparatus, comprising:
   a lower case;
   an upper case mounted in a longitudinal direction and coupled to the lower case;
   a strainer mounted inside the upper case;
   a raw water inflow pipe coupled to one side wall of a lower portion of the upper case;
   a distribution plate disposed between the upper case and the lower case; and
   a slant board disposed inside the enclosure that couples a lower end portion of the strainer with an edge surface of the distribution plate, a first surface of the slant board being disposed at an angle with respect to the raw water inflow pipe such that raw water introduced into the upper case through the raw water inflow pipe is directed towards an upper end of the upper case, and a second surface of the slant board being operable to direct some of water discharged from the strainer along the slant board towards the second case;
   fiber ball filters disposed inside the lower case and providing a first filtering layer; and
   fiber filters surrounding an outside of the strainer and providing a second filtering layer, wherein
   the fiber ball filters are first washed by water introduced from a lower portion of the lower case, and the
   the water having an elevated water level second washes the fiber filters and is discharged out through a backwash water discharge pipe at an upper portion of the upper case.

16. The hybrid type fiber filtering apparatus according to claim 15, further comprising:
   strainer nozzles disposed at a lower face of the lower case that spray washing water.

17. The hybrid type fiber filtering apparatus according to claim 16, wherein the strainer nozzles provide a stream of water having a circulation current facing upward at a middle part and facing downward at an edge part inside the lower case.

18. The hybrid type fiber filtering apparatus according to claim 16, wherein the water moving to the upper case leaves the strainer through through holes of the strainer so as to wash the fiber filters.

19. The hybrid type fiber filtering apparatus according to claim 16, further comprising:
   a backwash nozzle disposed at a lower portion of the strainer that sprays water or air to shake the fiber filters.

* * * * *